US009229136B2

(12) United States Patent
Akiyama et al.

(10) Patent No.: US 9,229,136 B2
(45) Date of Patent: Jan. 5, 2016

(54) MICROLENS ARRAY UNIT AND IMAGE PROCESSING APPARATUS

(71) Applicant: TOSHIBA TEC KABUSHIKI KAISHA, Tokyo (JP)

(72) Inventors: Ryozo Akiyama, Shizuoka (JP); Atsushi Kubota, Shizuoka (JP)

(73) Assignee: Toshiba Tec Kabushiki Kaisha, Tokyo (JP)

(*) Notice: Subject to any disclaimer, the term of this patent is extended or adjusted under 35 U.S.C. 154(b) by 152 days.

(21) Appl. No.: 14/039,952

(22) Filed: Sep. 27, 2013

(65) Prior Publication Data
US 2014/0084141 A1 Mar. 27, 2014

(30) Foreign Application Priority Data

Sep. 27, 2012 (JP) ................. 2012-214243

(51) Int. Cl.
| | |
|---|---|
| G02B 1/10 | (2015.01) |
| G02B 3/00 | (2006.01) |
| G02B 5/00 | (2006.01) |
| C09D 11/101 | (2014.01) |
| C09D 11/30 | (2014.01) |
| C09D 11/322 | (2014.01) |

(52) U.S. Cl.
CPC ............. *G02B 1/10* (2013.01); *C09D 11/101* (2013.01); *C09D 11/30* (2013.01); *C09D 11/322* (2013.01); *G02B 3/0006* (2013.01); *G02B 5/003* (2013.01)

(58) Field of Classification Search
CPC combination set(s) only.
See application file for complete search history.

(56) References Cited

U.S. PATENT DOCUMENTS

| | | | |
|---|---|---|---|
| 7,858,670 B2 | 12/2010 | Akiyama et al. | |
| 2007/0181785 A1* | 8/2007 | Helbing et al. | ............... 250/221 |
| 2010/0014313 A1* | 1/2010 | Tillin et al. | ................... 362/606 |

FOREIGN PATENT DOCUMENTS

| | | |
|---|---|---|
| JP | 2001330709 A | 11/2001 |
| JP | 2009222792 A | 10/2009 |
| JP | 2010095583 A | 4/2010 |
| JP | 2011063652 A | 3/2011 |
| WO | 2009113615 A1 | 9/2009 |

OTHER PUBLICATIONS

Japanese Office Action dated Aug. 12, 2014, filed in Japanese counterpart Application No. 2012-214243, 13 pages (with translation).

* cited by examiner

*Primary Examiner* — Francis M Legasse, Jr.
(74) *Attorney, Agent, or Firm* — Patterson & Sheridan, LLP

(57) ABSTRACT

A light blocking ink includes a vinyl ether compound, an alicyclic epoxy compound, an oxetane compound, a light blocking material, and a photoacid generating agent. The light blocking ink may be employed in a microlens array unit to block stray light. The microlens array unit may be employed in an image processing apparatus.

8 Claims, 2 Drawing Sheets

MICROLENS ARRAY UNIT AND IMAGE PROCESSING APPARATUS

CROSS-REFERENCE TO RELATED APPLICATION

This application is based upon and claims the benefit of priority from Japanese Patent Application No. 2012-214243, filed Sep. 27, 2012, the entire contents of which are incorporated herein by reference.

FIELD

Embodiments described herein relate generally to light blocking ink, particularly light blocking ink used for forming a light blocking film of a lens array unit.

BACKGROUND

In a lens array unit used in an optical device, a light blocking film is disposed at an area between adjacent lenses to absorb stray light. Such an optical device can be employed in an image processing apparatus such as a printer, a copier, a multifunction printer (MFP), a facsimile, a scanner, a liquid crystal display device, a solid-state imaging device, a multiple image transmission device of an optical interconnection system, and a confocal laser microscope. In addition, a technology of such a lens array unit can be applied to an optical communication field, an optical disc field, an image display field, an image transmission-connection field, an optical measurement field, an optical sensing field, an optical processing field, and the like.

A method for forming such a light blocking film includes a method of printing black ink, which can be cured by ultraviolet rays, on the area between the adjacent lenses and then curing the ink, a method of developing the film and removing a portion of the film by a photolithography, and the like.

DETAILED DESCRIPTION

Figure 1A:
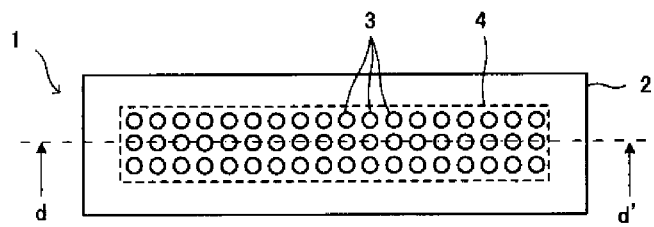
FIGS. 1A to 1C illustrate an example of a microlens array according to an embodiment.

In forming a light blocking film by applying ink, there is a concern that the applied ink may block the ultraviolet rays, which is used to cure the ink during irradiation of the ultraviolet rays, and the ultraviolet rays may be attenuated in a depth direction of the ink and thus the ink may not be sufficiently cured.

The embodiment provides ink capable of being cured reliably using ultraviolet rays, supplied between a plurality of lenses of a lens array, and a microlens array unit including light blocking films formed with the ink.

In general, according to embodiments, the light blocking ink includes a vinyl ether compound, an alicyclic epoxy compound, an oxetane compound, a light blocking material, and a photoacid generating agent.

Hereinafter, the embodiment will be described in detail with reference to the drawings. When the same reference numerals are used in the following descriptions, the same reference numerals mean to have the same configuration and function.

Microlens Array

Figure 1B:
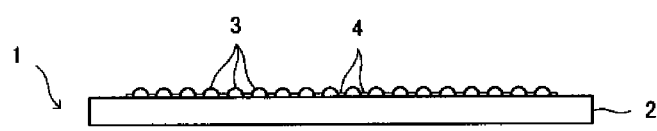
Figure 1C:
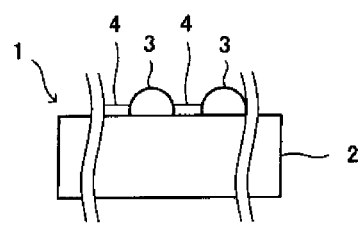

A configuration of a microlens array according to an embodiment will be described in detail with reference to FIGS. 1A to 1C. FIGS. 1A to 1C illustrate a microlens array 1 according to the embodiment, wherein FIG. 1A is a top view of the microlens array 1, FIG. 1B is a cross-sectional view taken along dashed line d-d' of FIG. 1A, and FIG. 1C is an enlarged view of FIG. 1B.

As shown in FIGS. 1A to 1C, the microlens array 1 includes a plurality of lenses 3 on a transparent substrate 2. The microlens array 1 includes light blocking film 4 of a black color and having a depth (film thickness) of 12 $\mu$m, for example, which is formed between the adjacent lenses 3. "Between the adjacent lenses 3" means that the light blocking film 4 is formed at non-lens portions. The light blocking film 4 is formed with light blocking ink according to the embodiment. The substrate 2 and the lenses 3 of the microlens array 1 are formed with metallic molding, for example. In FIGS. 1A to 1C, a case in which the microlenses are disposed on one surface of the substrate 2 is illustrated; however, the microlenses can be formed on both surfaces of the substrate 2. The microlens array 1 and the light blocking films 4 are collectively referred to as a microlens array unit, in some cases.

Figure 2:
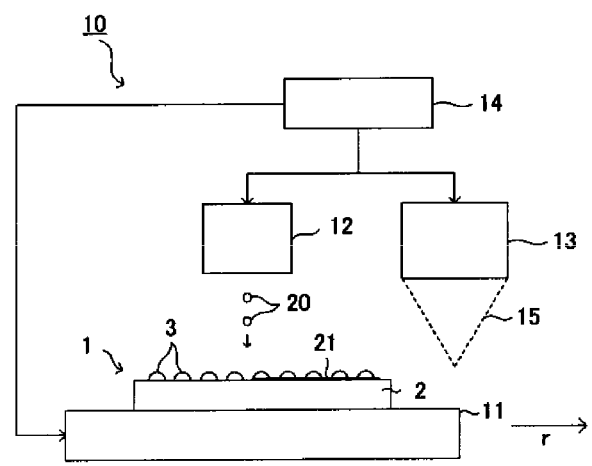
FIG. 2 illustrates an example of a light blocking film forming device for manufacturing the microlens array according to the embodiment.

A light blocking film forming device including an ink jet head is used for forming the light blocking film 4, for example. FIG. 2 shows a schematic configuration of a light blocking film forming device 10.

As shown in FIG. 2, the light blocking film forming device includes a transportation table 11 transporting the microlens array 1, an ink jet printing unit 12 ejecting light blocking ink 20, an ultraviolet ray irradiation unit 13, and a control unit 14 which controls the above units.

The transportation table 11 holds the lens array 1 formed on the transparent substrate 2 including the plurality of lenses 3, moves in an arrow "r" direction, and transports the lens array 1 to a position of the inkjet printing unit 12 and to a position of the ultraviolet ray irradiation unit 13. The ink jet printing unit 12 ejects the light blocking ink 20 towards an area of the substrate 2 between the adjacent lenses 3 from the top of the transparent substrate 2. The ultraviolet ray irradiation unit 13 irradiates light blocking ink 21 ejected to the substrate 2 with ultraviolet rays 15, from the top of the transparent substrate 2. In a case of the lens array in which the microlenses are disposed on both surfaces of the substrate 2, after forming the light blocking film on one surface (front surface), the substrate 2 is turned around and set on the transportation table 11, and by performing the same operation, the light blocking film can be formed on the other surface (rear surface) of the substrate 2.

The control unit 14 controls transportation speed and transportation timing of the transportation table 11. In addition, the control unit 14 controls an amount of the light blocking ink 20 ejected from the ink jet printing unit 12. The ejected amount of the light blocking ink 20 is controlled by adjusting a voltage applied to the ink jet printing unit 12 for ejecting the ink, for example. As another controlling method, with a multi-drop printing for dropping a plurality of minute light blocking ink droplets ejected from the ink jet printing unit 12 to the same position, the ejected amount of the light blocking ink can be controlled by adjusting the number of the liquid droplets. Further, the control unit 14 controls irradiance of the ultraviolet rays, a wavelength of the ultraviolet rays, and the like of the ultraviolet ray irradiation unit 13.

By replacing the ink jet printing unit 12 with an ink applying device, the light blocking film forming device 10 can supply the light blocking ink 20 not by the ink jet method, but by an application method. The transportation table 11 may be fixed and the ink jet printing unit 12 and the ultraviolet ray irradiation unit 13 may scan the substrate 2 by moving along the microlens array, and a plurality of ink jet printing units 12 and ultraviolet ray irradiation units 13 may be provided. For efficient curing of the light blocking ink 21, the ultraviolet ray irradiation can be also performed from the rear surface of the substrate 2, by forming a portion of the transportation table 11 for attaching the substrate 2 with a glass plate, for example.

In a case of using a cationic photo-curable material, which will be described later, efficient curing can be performed by heating the light blocking ink after the ultraviolet ray irradiation. The cations generated by the heating after the irradiation diffuse, and reactive polymerizable compounds such as monomers or oligomers can be effectively cured due to polymerization. However, since it is necessary to control the heating temperature or the heating time in a range of not affecting the lens shape, optical properties of the lens, or the like, attention is required to be paid in the heating.

Light Blocking Ink

The light blocking ink 20 used for forming the light blocking film 4 is mainly formed of light blocking materials and photo-curing materials.

For the light blocking materials, an optical light blocking property and a reflective property are primarily required. In addition, in a case of using the ink jet printing method, a flying property, dispersion stability, and the like as the ink properties are further required. In consideration of these properties, pigments having a light absorbing property are used for the light blocking materials.

Examples of such light blocking materials include carbon-based pigments such as carbon black and carbon nanotubes, metal oxide pigments such as iron black, zinc oxide, titanium oxide, chromium oxide, and iron oxide, sulfide pigments such as zinc sulfide, phthalocyanine-based pigments, pigments formed of salts such as sulfates, carbonates, silicates, and phosphates of metals, and pigments formed of metal powder such as aluminum powder, bronze powder, and zinc powder. One of these pigments can be used alone or two or more pigments can be used in combination.

The particle size of the light blocking materials is not particularly limited, as long as a desired film thickness can be formed, and the particle size thereof can be suitably selected according to a printing method. For example, in a case of using the ink jet printing method, the particle size thereof is preferably equal to or less than 300 nm, from a viewpoint of clogging of the ink or an ejecting property such as a flying property.

The ratio of the light blocking materials with respect to the entire light blocking ink is not particularly limited as long as the ratio thereof is in a range of satisfying the light blocking property, and in a case of using the ink jet printing method, for example, the ratio thereof is preferably 6% by weight to 20% by weight from a viewpoint of the ejecting property, in addition to the light blocking property.

The photo-curing materials used for the light blocking ink of the embodiment are main component of the light blocking film, and are formed of reactive polymerizable compounds which are polymerized with light, such as reactive monomers and oligomers having a polymerizable functional group, and a photoinitiator which starts this polymerization.

Currently, various reactive polymerizable compounds are used for various purposes, and based on pattern of the polymerization, the reactive polymerizable compounds can be divided into a radical type and a cation type. As the radical-type reactive polymerizable compounds, an acrylic monomer/oligomer having an acryloyl functional group is representative, and the polymerization is facilitated by radicals generated from the photoinitiator irradiated with light. At the time of the radical type polymerization, the occurrence of oxygen inhibition and relatively large volume contraction after the curing are disadvantages.

Meanwhile, examples of the cation-type reactive polymerizable compounds include a cyclic ether compound represented by an epoxy or oxetane compound and a vinyl ether compound having a vinyl ether group, and a photoacid generating agent, which starts polymerization using protons generated by light irradiation, is used as a photoinitiator. Among them, the cyclic ether compound has small volume contraction after polymerization, and accordingly has an excellent adhesiveness with a base material. The cationic polymerization is different from the radical type polymerization in points of performing polymerization without oxygen inhibition and having an excellent property for forming a thin film.

For the light blocking film for the microlens array unit, materials which satisfy both the above-described properties and the ink properties suitable for the ink jet method can be selected. That is, the material used for the light blocking ink of the embodiment is not particularly limited, as long as the material satisfies properties such as the light blocking property, the reflective property, cured film strength, and ultraviolet ray curing conditions, physical properties such as viscosity and surface tension as the ultraviolet curable ink property with the ink jet method, light blocking dispersion stability, compatibility with a head member, and the like. Hereinafter, examples of the preferred photo-curing materials in the embodiment will be described.

The reactive polymerizable compounds suitably used in the embodiment are the cationic reactive polymerizable compounds which start the polymerization by the photoacid generating agent, and include an alicyclic epoxy compound, an oxetane compound, and a vinyl ether compound. By using these compounds together, an excellent curing property can be obtained and excellent adhesiveness with the base material can be achieved.

As the alicyclic epoxy compound, a hydrocarbon group having a divalent aliphatic skeleton or alicyclic skeleton, or a compound having an epoxy group or an alicyclic epoxy group in one or both divalent groups partially having an aliphatic chain or an alicyclic skeleton can be used. Examples thereof include an alicyclic epoxy such as CELLOXIDE 2021, CELLOXIDE 2021A, CELLOXIDE 2021P, CELLOXIDE 2081, CELLOXIDE 2000, and CELLOXIDE 3000 manufactured by Daicel Corporation, CYCLOMER A200, CYCLOMER M100, and methyl glycidyl methacrylate (MGMA) which are (meth)acrylate compounds having an epoxy group, a low-molecular epoxy compound such as glycidol, β-methyl epichlorohydrin, α-pinene oxide, C12 to C14 α-olefin monoepoxide, and C16 to C18 α-olefin monoepoxide, epoxidized soybean oil such as Daimac S-300K, epoxidized linseed oil such as Daimac L-500, and a multifunctional epoxy such as Epolead GT301 and Epolead GT401. In addition, an alicyclic epoxy such as CYRACURE manufactured by Dow Chemical Company, a compound in which a terminal hydroxyl group of a hydrogenated aliphatic low-molecular phenol compound is substituted with a group having an epoxy, a glycidyl ether compound such as polyvalent aliphatic alcohols/alicyclic alcohols such as ethylene glycol, glycerin, neopentyl alcohol, hexanediol, and trimethylolpropane, and glycidyl esters of hexahydrophthalic acid or hydrogenated aromatic polyvalent carboxylic acids can be used.

These alicyclic epoxy compounds may be used alone or in combination of two or more kinds.

Examples of the vinyl ether compound include aliphatic monovinyl ether compounds such as 2-ethylhexyl vinyl ether, 4-hydroxybutyl vinyl ether, cyclohexanedimethanol monovinyl ether, and diethylene glycol monovinyl ether, and aliphatic divinyl ether compounds such as hexanediol divinyl ether, triethylene glycol divinyl ether, butanediol divinyl ether, cyclohexanedimethanol divinyl ether, and diethylene glycol divinyl ether. Among them, the aliphatic divinyl ether compounds are particularly preferable since it is possible to further improve curing properties of the compounds. The vinyl ether compound may be used alone, or two or more kinds may be used in combination.

Examples of the oxetane compound include compounds in which one or more oxcetane-containing groups are introduced into alicyclic compounds such as (di[1-ethyl(3-oxetanyl)]methyl ether, 3-ethyl-3-(2-ethylhexyloxy methyl)oxetane, [(1-ethyl-3-oxetanyl)methoxy]cyclohexane, bis[(1-ethyl-3-oxetanyl)methoxy]cyclohexane, and bis[(1-ethyl-3-oxetanyl)methoxy]norbornane, oxetane-containing alcohols such as 3-ethyl-3-oxetanemethanol, ether compounds in which the oxetane-containing alcohol is subject to dehydration synthesis to aliphatic polyvalent alcohols such as ethylene glycol, propylene glycol, and neopentyl alcohol, and oxetane compounds containing an aromatic skeleton such as 1,4-bis((1-ethyl-3 oxetanyl)methoxy)benzene, 1,3-bis((1-ethyl-3 oxetanyl)methoxy)benzene, 4,4'-bis((3-ethyl-3 oxetanyl)methoxy)biphenyl, and phenol novolac oxetanes. Among them, 3-ethyl-3-oxetanemethanol is particularly preferable since it has excellent adhesiveness with the base material. The oxetane compound may be used alone, or two or more kinds of oxetane compounds may be used in combination.

A ratio of the reactive polymerizable compounds with respect to the entire ink is preferably 69% by weight to 84% by weight. When the ratio thereof is less than 69% by weight, the light blocking material becomes relatively abundant in the ink, and the curing effect may be insufficient with a light irradiation for a short time. On the other hand, when the ratio thereof exceeds 84% by weight, in a case of forming a thin light blocking film, a sufficient light blocking property may not be achieved. The case in which a ratio of the aliphatic divinyl ether compound with respect to the entire ink is equal to or more than 40% by weight is particularly preferable since it is possible to obtain a more excellent curing property.

Examples of the photoacid generating agent include onium salts, diazonium salts, iodonium salts, quinone diazide compounds, organic halides, aromatic sulfonate compounds, bisulfone compounds, sulfonyl compounds, sulfonate compounds, sulfonium compounds, sulfamide compounds, sulfonyl diazomethane compounds, and a mixture thereof. Examples thereof include triphenyl sulfonium triflate, diphenyl iodonium triflate, 2,3,4,4-tetrahydroxybenzophenone-4-naphthoquinone diazide sulfonate, 4-N-phenylamino-2-methoxyphenyl diazonium sulfate, 4-N-phenylamino-2-methoxyphenyl diazonium p-ethylphenylsulfate, 4-N-phenylamino-2-methoxyphenyl diazonium 2-naphthyl sulfate, 4-N-phenylamino-2-methoxyphenyl diazonium phenyl sulfate, 2,5-diethoxy-4-N-4'-methoxyphenyl carbonyl phenyl diazonium-3-carboxy-4-hydroxyphenyl sulfate, 2-methoxy-4-N-phenylphenyl diazonium-3-carboxy-4-hydroxyphenyl sulfate, diphenylsulfonylmethane, diphenylsulfonyldiazomethane, diphenyldisulfone, α-methylbenzoin tosylate, pyrogallol trimesylate, benzoin tosylate, and the like. Among them, the iodonium salt-based acid generating agent is preferable since a coloring property when the reactive polymerizable compound is polymerized is greater than other salts and a more excellent light blocking property is achieved.

It is preferable to include a photosensitizer in the light blocking ink of the embodiment, and an anthracene diether compound expressed by the following formula can be used for such a photosensitizer, for example.

[Chem. 1]

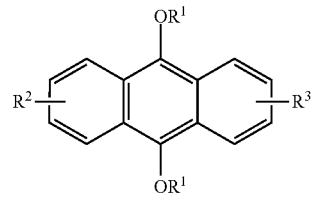

(wherein, R' represents a monovalent organic group having 1 to 5 carbon atoms, and $R^2$ and $R^3$ each independently represent a hydrogen atom, an alkyl group having 1 to 3 carbon atoms, an alkylsulfonyl group or an alkoxy group.)

In the formula, examples of the monovalent organic group which is represented as $R^1$ include an alkyl group, an aryl group, a hydroxyalkyl group, an alkoxyalkyl group, an allyl group, a benzyl group, and a vinyl group.

Examples of the alkyl group include a methyl group, an ethyl group, an n-propyl group, an i-propyl group, an n-butyl group, an i-butyl group, a t-butyl group, an n-pentyl group, and an i-pentyl group. Examples of the aryl group include a phenyl group, a biphenyl group, an o-tolyl group, an m-tolyl group, and a p-tolyl group, and examples of the hydroxyalkyl group include a 2-hydroxyethyl group, a 3-hydroxypropyl group, a 2-methyl-2-hydroxyethyl group, and a 2-ethyl-2-hydroxyethyl group. In addition, examples of the alkoxyalkyl group include a 2-methoxyethyl group, a 3-methoxypropyl group, a 2-ethoxyethyl group, and a 3-ethoxypropyl group, and examples of the allyl group include a 2-methylallyl group and the like. The compounds having such groups can be synthesized by a method disclosed in J. Am. Chem. Soc., Vol. 124, No. 8, 1590 (2002), for example.

$R^2$ and $R^3$ are not particularly limited as long as they are represented in the formula, and both of them are preferably hydrogen atoms in terms of simple synthesis.

Examples of the compound represented by the above-described formula include dialkoxyanthracenes such as 9,10-dimethoxyanthracene, 9,10-diethoxyanthracene, 9,10-dipropoxyanthracene, 9,10-dibutoxyanthracene, 2-ethyl-9,10-diethoxyanthracene, and 2,3-diethyl-9,10-diethoxyanthracene, 9,10-diphenoxyanthracene, 9,10-diallyloxymethylanthracene, 9,10-di(2-methylallyloxy) anthracene, 9,10-divinyloxyanthracene, 9,10-di(2-hydroxyethoxy)anthracene, 9,10-di(2-methoxyethoxy) anthracene, and the like. Any of these compounds can be used to exhibit sufficient effects, however, 9,10-dibutoxyanthracene and 9,10-divinyloxyanthracene are particularly preferable, in terms of purchase cost of the compound or the synthetic raw materials thereof, and safety of the compound.

A ratio of the photosensitizer with respect to the photoacid generating agent depends on the kind of the compound to be used. However, in general, if the photosensitizer is combined at a ratio of about 10% by weight to 50% by weight with respect to the photoacid generating agent, the effect thereof can be achieved.

In addition, a polymerization inhibitor can be included in the light blocking ink of the embodiment, if necessary. The polymerization inhibitor may be of cationic type or radical type. In a case of the cationic type, n-hexylamine, dodecylamine, aniline, dimethylaniline, diphenylamine, triphenylamine, diazabicyclooctane, diazabicycloundecane, 3-phenylpyridine, 4-phenylpyridine, lutidine, 2,6-di-t-butylpyridine, and the like can be used. In a case of the radical type, DPPH (1,1-diphenyl-2-picrylhydrazyl), TEMPO (2,2,6,6-tetramethyl piperidinyl-1-oxyl), p-benzoquinone, chloranil, nitrobenzene, hydroquinone (HQ), methyl hydroquinone (MEHQ), t-butylcatechol, dimethylaniline, and the like are used.

In order to produce an ultraviolet-curable light blocking ink including these materials, after performing a dispersion step of dispersing the light blocking material in monomers, and a mixing step of mixing and stirring while adding suitable reactive polymerizable compounds such as a monomer and oligomer and photoacid generating agent, and if necessary, additives such as the sensitizer and the polymerization inhibitor, to the obtained dispersion liquid, a purification step of performing filtering or centrifugal separation for removing coarse particles or unnecessary solid content is performed. In the dispersion step, a dispersant can be added, if necessary, for improving the dispersion properties of the blocking materials. Examples of the dispersant include nonionic and ionic surfactants, and a polymer dispersant.

In a case of producing the light blocking ink to be used in the ink jet printing method, it is desirable to set the viscosity of the ink in a range of 5 mPa·s to 30 mPa·s at 25° C., and the surface tension thereof in a range of 22 mN/m to 40 mN/m. The viscosity or the surface tension of the light blocking ink can be set by a ratio of the reactive polymerizable compounds, the surfactant or the like with respect to the ink.

Image Processing Apparatus

The microlens array unit according to the embodiment is used in an image processing apparatus as described below.

Figure 3:
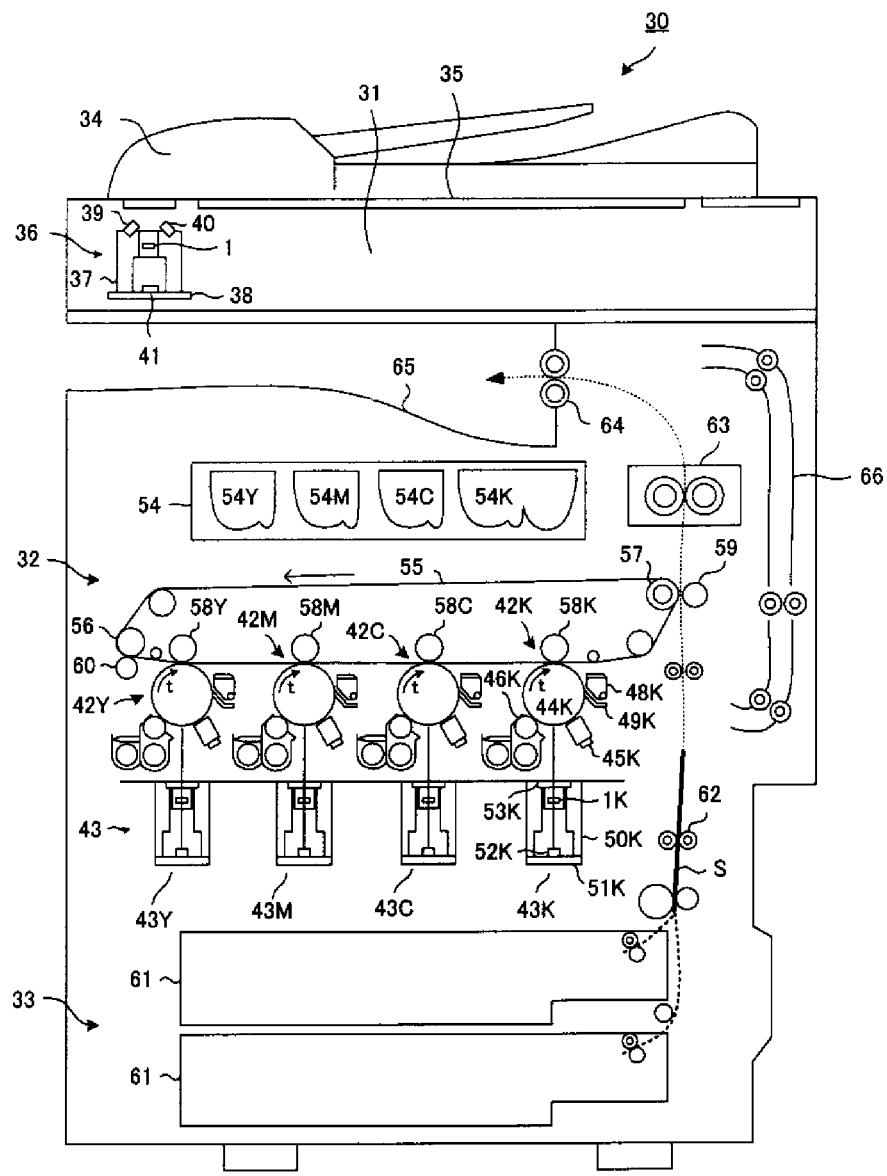
FIG. 3 illustrates an example of an image processing apparatus according to the embodiment.

FIG. 3 shows a schematic configuration of an image forming apparatus 30 according to the embodiment. As shown in FIG. 3, the image forming apparatus 30 includes a scanner unit 31 which reads an image of a document or the like, a printer unit 32 which processes image data or the like generated in the scanner unit 31 to form an image on paper, and a paper feeding unit 33 which feeds paper to the printer unit 32.

The scanner unit 31 is provided on an upper portion of the image forming apparatus 30, is a unit which reads a document sent by an automatic document transportation device 34 or a document placed on a document table 35 and generates image data, and includes an image sensor 36.

The image sensor 36 is a one-dimensional sensor disposed in a main scanning direction (depth direction in FIG. 3), and includes a case 37. The case 37 is disposed on a substrate 38, and light sources (light emitting elements) 39 and 40 which emit light to a direction of a document are provided so as to be extended in the main scanning direction on the upper surface of the case 37 on the document table 35 side. As the light sources 39 and 40, an LED, a fluorescent tube, a xenon tube, a cold-cathode tube, an organic EL or the like can be used. The microlens array 1 is supported between the light sources 39 and 40 on the upper portion of the case 37, and a sensor 41, such as a CCD, a CMOs, or the like, is mounted on the substrate 38 which is on the bottom portion of the case 37.

The light sources 39 and 40 irradiate an image reading position of a document placed on the document table 35, and light reflected from the image reading position enters the microlens array 1. The microlens array 1 functions as an erecting equal-magnification lens, and the light incident to the microlens array 1 exits from an exit surface of the microlens array 1, and is focused on the sensor 41. The focused light is converted into an electric signal by the sensor 41, and the electric signal is transmitted to a memory unit (not shown) of the substrate 38.

The printer unit 32 is provided on a center portion of the image forming apparatus 30, and includes image forming units 42Y, 42M, 42C, and 42K which perform image forming of yellow (Y), magenta (M), cyan (C), and black (K) respectively, and an exposure device 43 including scanning heads 43Y, 43M, 43C, and 43K corresponding to the image forming units. The image forming units 42Y, 42M, 42C, and 42K are disposed on a lower side of an intermediate transfer belt 55 in parallel from upstream to downstream in a direction in which the intermediate transfer belt 55 moves.

Hereinafter, the image forming unit 42K will be described as an example, since the image forming units 42Y, 42M, 42C, and 42K have the same configuration. In the same manner, the scanning head 43K will be described as an example, since the scanning heads 43Y, 43M, 43C, and 43K have the same configuration.

The image forming unit 42K includes a photoconductor drum 44K, which is an image holding body. In a vicinity of the photoconductor drum 44K, a charger 45K, a developing unit 46K, a primary transfer roller 58K, a cleaner 48K, and a blade 49K, and the like are disposed along a rotation direction "t." An exposure position of the photoconductor drum 44K is irradiated with light from the scanning head 43K, and an electrostatic latent image is formed on the photoconductor drum 44K.

The charger 45K evenly charges the entire surface of the photoconductor drum 44K. The developing unit 46K supplies a two-component developer containing a black toner and a carrier to the photoconductor drum 44K by a developing roller to which a developing bias is applied. The cleaner 48K removes toner remaining on the surface of the photoconductor drum 44K using the blade 49K.

The scanning head 43K includes a microlens array unit 1K, and the microlens array unit 1K is supported by a holding member 50K. In addition, a supporter 51K is provided on a bottom portion of the holding member 50K, and light emitting elements 52K such as LED is disposed on the supporter 51K. The light emitting elements 52K are provided linearly in the main scanning direction with even intervals. In addition, a substrate (not shown) containing a driver IC which controls light emission of the light emitting element 52K is disposed on the supporter 51K. The driver IC forms a control unit, generates a control signal to control the scanning head 43K based on the image data, and allows the light emitting element 52K to emit light with predetermined light intensity according to the control signal. The light rays exiting from the light emitting element 52K enter the lens array 1, pass through the lens array 1 to be focused on the photoconductor drum 44K, and an image is formed on the photoconductor drum 44K. In addition, a cover glass 53K is attached to an upper portion (exit side) of the scanning head 43K.

A toner cartridge 54 which supplies toner to the developing units 46Y, 46M, 46C, and 46K, is provided on an upper portion of the image forming units 42Y, 42M, 42C, and 42K. The toner cartridge 54 includes toner cartridges 54Y, 54M, 54C, and 54K of respective colors which are yellow (Y), magenta (M), cyan (C), and black (K).

The intermediate transfer belt 55 moves cyclically. The intermediate transfer belt 55 is extended by a driving roller 57 and a driven roller 56. In addition, the intermediate transfer belt 55 opposes and is in contact with the photoconductor drums 44Y, 44M, 44C, and 44K. Primary transfer voltage is applied to a position of the intermediate transfer belt 55 opposing the photoconductor drum 44K, by the primary transfer roller 58K, and the toner image on the photoconductor drum 44K is primarily transferred to the intermediate transfer belt 55.

A secondary transfer roller 59 is disposed to oppose the driving roller 57 extending the intermediate transfer belt 55. When a sheet S passes between the driving roller 57 and the secondary transfer roller 59, secondary transfer voltage is applied to the sheet S by the secondary transfer roller 59. Then, a toner image on the intermediate transfer belt 55 is secondarily transferred to the sheet S. A belt cleaner 60 is provided in the vicinity of the intermediate transfer belt 55.

The paper feeding unit 33 includes a plurality of paper feeding cassettes 61 which accommodate sheets of various sizes. A transporting roller 62 which transports the sheet S taken out from the inside of the paper feeding cassette 61 is provided between the paper feeding cassette 61 and the secondary transfer roller 59. A fixing device 63 is provided downstream with respect to the secondary transfer roller 59. A transporting roller 64 is provided downstream with respect to the fixing device 63. The transporting roller 64 discharges the sheet S to a paper discharging tray 65. Further, a reverse transporting path 66 is formed downstream with respect to the fixing device 63. The reverse transporting path 66 reverses the sheet S to introduce the sheet in a direction of the secondary transfer roller 59, and is used when performing double-sided printing.

Application by Dispenser

As a method of applying the light blocking ink and the lens unit materials to form the microlens array unit according to the embodiment, application of a very small amount of liquid by a dispenser can be performed. For example, it can be performed by a non-contact type jet dispenser (CyberJet 2) manufactured by Musashi Engineering, Inc., a micro dispenser (Heishin Micro Dispenser) manufactured by HEISHIN Ltd., or a micro dispenser (Nanojet) manufactured by Microdrop Technologies. A predetermined amount of the light blocking ink or lens unit material liquid is applied on the lens base material using the above dispensers, curing is performed immediately after the application, and the application and curing are repeated, to form a lens configuration.

EXAMPLES

Hereinafter, the embodiment will be described in more detail with practical examples.

Preparation of Light Blocking Dispersion Liquid

The light blocking material, the dispersant, and the reactive polymerizable compound as a solvent shown below were mixed with the following combination ratio.

| | |
|---|---|
| Light blocking material (carbon black pigment) | 20% by weight |
| Dispersant (Avecia Solsperse 32000) | 5.5% by weight |
| Dispersant (Avecia Solsperse 22000) | 0.7% by weight |
| Reactive polymerizable compound (TEGDVE) | 73.8% by weight |

A dispersion treatment was performed on the obtained mixture for about 1 hour using a circulating sand mill filled with beads having a diameter of 0.5 mm. After the dispersion treatment, the coarse particles were removed using a filter having a pore diameter of 5 μm, and a light blocking dispersion liquid was obtained. In addition, with the same procedure, each light blocking dispersion liquid was prepared using CHMME, DEGDVE, OXT-221, and C2021, instead of TEGDVE. Further, a light blocking dispersion liquid including DEGDVE as the solvent, and titanium black pigment as the light blocking material was prepared.

Preparation of Light Blocking Ink

The reactive polymerizable compounds, the photoacid generating agent, and the sensitizer were combined with the prepared light blocking dispersion liquid, and were mixed and stirred for about 1 hour using a stirrer such as a homogenizer. The obtained mixed liquids were filtered with a 5 μm membrane filter, to obtain ink Nos. 1 to 22. The light blocking dispersion liquids including TEGDVE as the solvent were identified as the ink Nos. 1 to 4, 8 to 10, 14, and 18 to 22, the light blocking dispersion liquids including DEGDVE were identified as the ink Nos. 6, 7, 11 to 13, and 16, and the light blocking dispersion liquids using CHMME, OXT-221, and C2021 were identified as ink Nos. 5, 15, and 17. The combination ratios of inks are shown in Table 1. Table 1 shows the combination ratio including the light blocking dispersion liquid, and the ratio of the dispersant is included in that of the reactive polymerizable compounds.

TABLE 1

| | Light blocking material | | Reactive polymerizable compound | | | | | | | Photoacid generating agent | | |
|---|---|---|---|---|---|---|---|---|---|---|---|---|
| | | | Vinyl ether compound | | | Oxetane compound | | Epoxy compound | | | | |
| | Carbon black | Titanium black | CHMME*1 | DEGDVE*2 | TEGDVE*3 | OXT-101*4 | OXT-221*5 | C3000*6 | C2021*7 | ESACURE 1064*8 | IRGACURE 250*9 | Sensitizer DBA*10 |
| No. 1 | 7.5 | | | | 51.5 | 15 | | 15 | | 10 | | 1 |
| No. 2 | 7.5 | | | | 46.5 | 15 | | 20 | | 10 | | 1 |
| No. 3 | 7.5 | | | | 40 | 20 | | 21.5 | | 10 | | 1 |
| No. 4 | 7.5 | | | | 37.5 | 20 | | 24 | | 10 | | 1 |
| No. 5 | 7.5 | | 41.5 | | | 20 | | 20 | | 10 | | 1 |
| No. 6 | 7.5 | | | 46.5 | | 15 | | 20 | | 10 | | 1 |
| No. 7 | 7.5 | | | 46.5 | | 18 | | | 17 | 10 | | 1 |
| No. 8 | 7.5 | | | | 37.5 | | 34 | 10 | | 10 | | 1 |
| No. 9 | 7.5 | | | | 40 | | 31.5 | 10 | | 10 | | 1 |
| No. 10 | 7.5 | | | | 45 | | 26.5 | 10 | | 10 | | 1 |
| No. 11 | | 7.5 | | 46.5 | | 20 | | 15 | | 10 | | 1 |
| No. 12 | | 7.5 | | 41.5 | | 20 | | 20 | | 10 | | 1 |

TABLE 1-continued

| | Light blocking material | | Reactive polymerizable compound | | | | | | | Photoacid generating agent | | |
|---|---|---|---|---|---|---|---|---|---|---|---|---|
| | | | Vinyl ether compound | | | Oxetane compound | | Epoxy compound | | | | Sensitizer |
| | Carbon black | Titanium black | CHMME*[1] | DEGDVE*[2] | TEGDVE*[3] | OXT-101*[4] | OXT-221*[5] | C3000*[6] | C2021*[7] | ESACURE 1064*[8] | IRGACURE 250*[9] | DBA*[10] |
| No. 13 | 7.5 | | | 42 | | | 32 | 10 | | | 7.5 | 1 |
| No. 14 | 7.5 | | | | 42 | | 32 | 10 | | | 7.5 | 1 |
| No. 15 | 7.5 | | 42 | | | | 32 | 10 | | | 7.5 | 1 |
| No. 16 | 7.5 | | 41 | 40.5 | | | | | | 10 | | 1 |
| No. 17 | 7.5 | | | | | | | 40 | 41.5 | 10 | | 1 |
| No. 18 | 5 | | | | | 44 | 20 | 20 | | 10 | | 1 |
| No. 19 | 6 | | | | | 43 | 20 | 20 | | 10 | | 1 |
| No. 20 | 10 | | | | | 41 | 19 | 19 | | 10 | | 1 |
| No. 21 | 20 | | | | | 37 | 16 | 16 | | 10 | | 1 |
| No. 22 | 21 | | | | | 36 | 16 | 16 | | 10 | | 1 |

Note
*[1] cyclohexanedimethanol monovinyl ether (alicyclic vinyl ether monomer; manufactured by Sigma-Aldrich Co. LLC.)
*[2] diethylene glycol divinyl ether (aliphatic vinyl ether monomer; manufactured by Sigma-Aldrich Co. LLC.)
*[3] triethylene glycol divinyl ether (aliphatic vinyl ether monomer; manufactured by Sigma-Aldrich Co. LLC.)
*[4] 3-ethyl-3-oxetanylmethanol (oxetane monomer; manufactured by TOAGOSEI CO., LTD.)
*[5] di(1-ethyl(3-oxetanyl)methyl ether (oxetane monomer; manufactured by TOAGOSEI CO., LTD.)
*[6] limonene dioxide (alicyclic epoxy monomer; manufactured by Daicel Corporation)
*[7] 3,4-epoxycyclohexylmethyl-3,4-epoxycyclohexanecarboxylate (alicyclic epoxy monomer; manufactured by Daicel Corporation)
*[8] sulfonium salt-based photoacid generating agent (manufactured by Lamberti Chemicals)
*[9] iodonium salt-based photoacid generating agent (manufactured by BASF)
*[10] 9,10-dibutoxyanthracene (manufactured by KAWASAKI KASEI CHEMICALS)

Evaluation of Inks

The following evaluation of the obtained inks Nos. 1 to 22 was performed.

Ejecting Property of Ink Jet

When the ejecting performance of the ink Nos. 1 to 22 was examined using a CB1 Head manufactured by TOSHIBA TEC CORPORATION, ejecting failure such as missing or misdirection did not occur in any ink.

Curing Property

Evaluation of the curing property was performed using the obtained ink Nos. 1 to 22. In the evaluation of the curing property, the ink was applied on the glass plate using a spin coater so that a formed film has a predetermined thickness, and UV light irradiation was performed with respect to this film under the irradiation conditions of an irradiation intensity of 1000 mW/cm$^2$ (365 nm) and a cumulated light amount of 1000 mJ/cm$^2$ using a UV light irradiation apparatus. The curing degree of the film after the UV light irradiation was determined by examining solidity thereof with a finger touch. The determination criteria were as follows. The evaluation results are shown in Table 2.

A: No mark observed.
B: Slight mark observed when touched with a finger.
C: Mark observed when touched with a finger.
D: Not cured or peeled off.

Transmission Density (OD)

Transmission density (OD) of the cured coating film was measured using a measuring device, 361T (measurement limit; OD=6.0) manufactured by X-Rite, Inc. The thickness of the coating films was adjusted so as to be about 12 μm as a cured film. The evaluation criteria were as follows. The evaluation results are shown in Table 2.

The transmission density (OD) is represented by logarithm with base 10 of opacity, and OD=log(1/T). Herein, T is transmittance, and a reciprocal number 1/T of the transmittance is opacity.

A: 5 or more
B: Equal to or more than 4 and less than 5
C: Less than 4

Adhesiveness

A peeling-off test with Sellotape (trade name) was performed with respect to the cured films, the peeling-off degree of the cured films was visually observed, and the cured films which had almost no peeling off were evaluated as excellent. The evaluation results are shown in Table 2.

TABLE 2

| | Evaluations | | |
|---|---|---|---|
| | Curing degree | Transmission density (OD) | Adhesiveness |
| No. 1 | A | A | Excellent |
| No. 2 | A | A | Excellent |
| No. 3 | A | A | Excellent |
| No. 4 | B | A | Excellent |
| No. 5 | C | A | Excellent |
| No. 6 | A | A | Excellent |
| No. 7 | B | A | Excellent |
| No. 8 | B | A | Degraded* |
| No. 9 | A | A | Degraded* |
| No. 10 | A | A | Degraded* |
| No. 11 | B | B | Excellent |
| No. 12 | B | B | Excellent |
| No. 13 | A | A | Degraded* |
| No. 14 | A | A | Degraded* |
| No. 15 | C | A | Degraded* |
| No. 16 | B | A | Particularly degraded* |
| No. 17 | D | — | — |
| No. 18 | A | C | Excellent |
| No. 19 | A | C | Excellent |
| No. 20 | A | A | Excellent |
| No. 21 | B | A | Excellent |
| No. 22 | C | A | Excellent |

In the evaluated inks, the ink Nos. 16 and 17 are inks as Comparative Examples, and the others are inks according to the embodiment. From the evaluation results shown in Table 2, it was found that, with respect to the inks (No. 1 to No. 15, and No. 18 to No. 22) of the embodiment, basic properties of the curing property and the OD value were both satisfied.

Among the inks of the embodiment, it was found that, the ink Nos. 1 to 3, 9, 10, 14, and 18 to 20 containing TEGDVE of 40% by weight or more as an aliphatic divinyl ether compound, particularly tended to show an excellent curing performance. It was found that the ink Nos. 5, 15, and 16, in which CHMVE instead of TEGDVE was combined as an alicyclic vinyl ether compound, tended to show a slightly degraded curing property.

When comparing the ink Nos. 1 to 15, with respect to the ink including OXT-101 (3-ethyl-3-oxetanemethanol) as the oxetane compound, it was found that, the curing property and the OD value were satisfied as the basic properties of the light blocking ink, and the adhesiveness were excellent.

Ink Nos. 11 and 12 are examples using the titanium black pigment for the light blocking material. It was found that the OD value was degraded with respect to that of the ink including the carbon black, but the light blocking property was obtained.

The ink Nos. 18 to 22 are examples in which the ratio of the carbon black pigment was changed. It was found that a property of OD value of 4 (12 μm) or more could be obtained when the concentration of the carbon black pigment was equal to or more than 6% by weight. With respect to the ink No. 18, in which the concentration of the pigment was 5% by weight, the light blocking property could be obtained by thick coating or over-coating of the ink, but such a coating is disadvantageous for manufacturing of the film. In addition, with respect to the ink No. 22, in which the concentration of the pigment was 21% by weight, the curing property was degraded.

Ink Nos. 13 to 15 are examples of inks including the iodonium salt-based compound as the photoacid generating agent. It was found that, the curing could be performed with lower concentration, compared to the other inks including the sulfonium salt-based compound.

In the embodiment, the MFP is described as an image forming device, however, it is not particularly limited thereto. A case of applying an image forming device to an image reading device having only a scanner function, or a case of applying an image forming device to an optical scanning unit of an electrophotographic printer is included in a range of the image processing apparatus according to the embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A microlens array unit comprising:
   a substrate;
   a microlens array including a plurality of microlenses arranged on the substrate; and
   a light blocking film formed on the substrate and between adjacent microlenses, by an ink including an aliphatic divinyl ether compound, an alicyclic epoxy compound, an oxetane compound, a light blocking material, and a photoacid generating agent, the aliphatic divinyl ether compound selected from a group consisting of hexanediol divinyl ether, triethylene glycol divinyl ether, butanediol divinyl ether, and diethylene glycol divinyl ether,
   wherein a weight ratio of the aliphatic divinyl ether compound to the ink is equal to or more than 40 percent.

2. The microlens array unit according to claim 1, wherein the oxetane compound is 3-ethyl-3-oxetanylmethanol.

3. The microlens array unit according to claim 1, wherein the alicyclic epoxy compound is limonene dioxide.

4. The microlens array unit according to claim 1, wherein the photoacid generating agent is a sulfonium salt-based photoacid generating agent.

5. An image processing apparatus comprising:
   a light emitting element; and
   a light receiving element including, a microlens array unit through which light reflected from an image region passes, the microlens array unit including,
   a substrate,
   a microlens array including a plurality of microlenses arranged on the substrate, and
   a light blocking film formed on the substrate and between adjacent microlenses, by an ink including an aliphatic divinyl ether compound, an alicyclic epoxy compound, an oxetane compound, a light blocking material, and a photoacid generating agent, the aliphatic divinyl ether compound selected from a group consisting of hexanediol divinyl ether, triethylene glycol divinyl ether, butanediol divinyl ether, and diethylene glycol divinyl ether, wherein a weight ratio of the aliphatic divinyl ether compound to the ink is equal to or more than 40 percent, and
   an image sensor configured to receive the light passing through the microlens array unit and convert the received light into an electric signal.

6. The image processing apparatus according to claim 5, wherein the oxetane compound is 3-ethyl-3-oxetanylmethanol.

7. The image processing apparatus according to claim 5, wherein the alicyclic epoxy compound is limonene dioxide.

8. The image processing apparatus according to claim 5, wherein the photoacid generating agent is a sulfonium salt-based photoacid generating agent.

* * * * *